United States Patent [19]
Bernardin

[11] Patent Number: 6,052,583
[45] Date of Patent: *Apr. 18, 2000

[54] METHODS AND SYSTEMS FOR SELECTING DRIVE ROUTES FOR TESTING RF COVERAGE IN A RADIOTELEPHONE SYSTEM

[75] Inventor: Charles Bernardin, Richardson, Tex.

[73] Assignee: Northern Telecom Limited, Canada

[*] Notice: This patent is subject to a terminal disclaimer.

[21] Appl. No.: 08/865,502

[22] Filed: May 29, 1997

[51] Int. Cl.[7] ........................................ H04Q 7/30
[52] U.S. Cl. ..................... 455/423; 455/33.1; 455/33.2
[58] Field of Search ................... 455/422, 446, 455/423, 424, 67.1, 67.6, 69; 364/516 R

[56] References Cited

U.S. PATENT DOCUMENTS

| | | | |
|---|---|---|---|
| 5,440,614 | 8/1995 | Sonberg et al. | 455/417 |
| 5,450,615 | 9/1995 | Fortune et al. | 455/67.6 |
| 5,465,390 | 11/1995 | Cohen | 455/423 |
| 5,465,397 | 11/1995 | Pickert | 455/465 |
| 5,499,395 | 3/1996 | Doi et al. | 455/422 |
| 5,594,943 | 1/1997 | Balachandran | 455/436 |
| 5,623,429 | 4/1997 | Fortune et al. | 364/578 |
| 5,732,354 | 3/1998 | MacDonald | 455/456 |

OTHER PUBLICATIONS

William C. Y. Lee, "Mobile Cellular Telecommunication Systems", p. 105, 1989.

Peyton Z. Peebles, "Probability Random Variables and Random Signals Principles", 1980.

*Primary Examiner*—Wellington Chin
*Assistant Examiner*—Pablo N. Tran
*Attorney, Agent, or Firm*—Carr & Storm, L.L.P.

[57] ABSTRACT

An information processing system 700 tests the RF coverage reliability of a signal transmitted by a base station in a radiotelephone system cell. Information processing system 700 includes processing circuitry for receiving information characterizing the cell and outputting in response test information, the processing system operable to: estimate a radius of the cell; estimate a bin size for each of a plurality of bins partitioning the cell; estimate a minimum drive distance for validating RF coverage of the cell from the estimated radius and the estimated bin size; and select a number or road segments having a combined length exceeding the estimated minimum distance.

16 Claims, 6 Drawing Sheets

*FIG. 5*
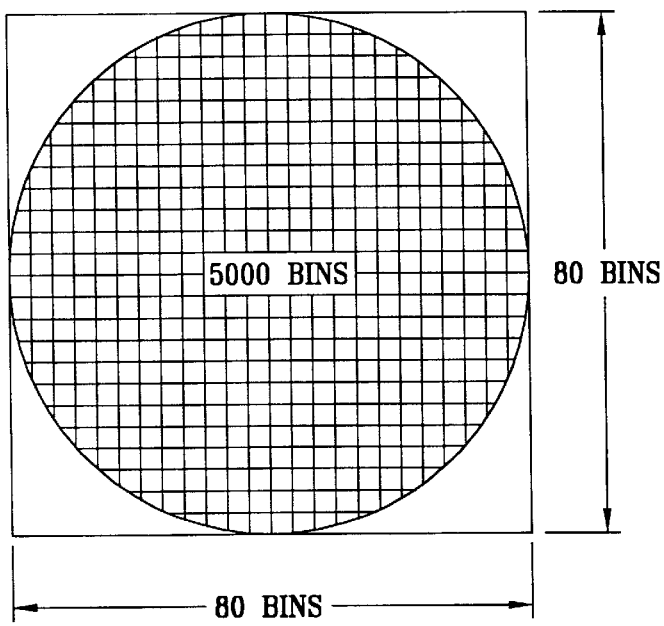
*FIG. 6A*  ±ΔR=±10%
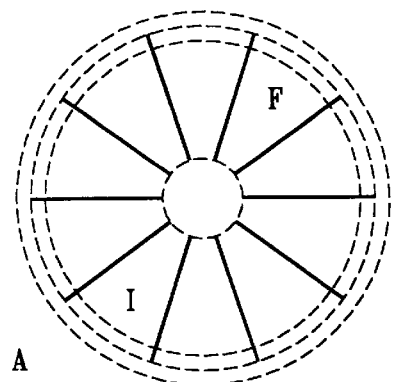
MUST DRIVE A DISTANCE OF
D=10 RADIALS FOR ΔR=10%
*FIG. 6B*  ±ΔR=±5%
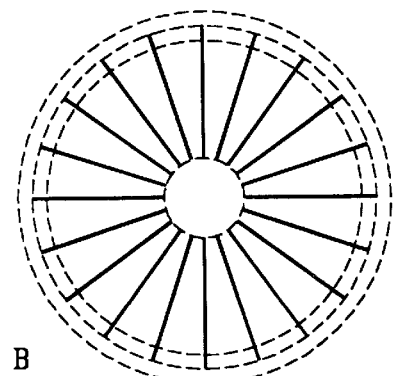
MUST DRIVE A DISTANCE OF
D=20 RADIALS FOR ΔR=5%

METHODS AND SYSTEMS FOR SELECTING DRIVE ROUTES FOR TESTING RF COVERAGE IN A RADIOTELEPHONE SYSTEM

CROSS-REFERENCE TO RELATED APPLICATIONS

The following co-pending and co-assigned United States patent applications contain related information and are incorporated herein by reference:

METHOD AND APPARATUS FOR ESTIMATING CELL RADIUS AND RELIABILITY IN A RADIOTELEPHONE SYSTEM, U.S. patent application Ser. No. 08/768,499, (Attorney's Docket No. RR-1162), filed on Dec. 18, 1996;

METHOD AND APPARATUS FOR ESTIMATING CELL RADIUS AND AREA COVERAGE RELIABILITY IN A RADIOTELEPHONE SYSTEM, U.S. patent application Ser. No. 08/768,714, (Attorney's Docket No. RR-2031), filed on Dec. 18, 1996;

METHOD AND APPARATUS FOR MINIMIZING THE NUMBER OF SAMPLES NEEDED TO DETERMINE CELL RADIUS COVERAGE AND CONTOUR RELIABILITY IN A RADIOTELEPHONE SYSTEM, U.S. patent application Ser. No. 08/768,450, (Attorney's Docket No. RR-2032), filed on Dec. 18, 1996;

METHOD AND APPARATUS FOR MINIMIZING THE NUMBER OF SAMPLES NEEDED TO DETERMINE CELL AREA COVERAGE RELIABILITY IN A RADIOTELEPHONE SYSTEM, U.S. patent application Ser. No. 08/769,690, (Attorney's Docket No. RR-2033), filed on Dec. 18, 1996;

METHOD AND APPARATUS FOR MINIMIZING THE AREA SAMPLED TO DETERMINE CELL AREA COVERAGE RELIABILITY IN A RADIOTELEPHONE SYSTEM, U.S. patent application Ser. No. 08/768,493, (Attorney's Docket No. RR-2034), filed on Dec. 18, 1996;

RADIOTELEPHONE NETWORK WITH AN OPTIMIZED CELL FOR BOUNDARY COVERAGE RELIABILITY, U.S. patent application Ser. No. 08/768,713, (Attorney's Docket No. RR-2043), filed on Dec. 18, 1996;

METHOD AND APPARATUS FOR A RADIOTELEPHONE SYSTEM OPTIMIZED FOR AREA COVERAGE RELIABILITY, U.S. patent application Ser. No. 08/768,708, (Attorney's Docket No. RR-2044), filed on Dec. 18, 1996; and

BACKGROUND OF THE INVENTION

1. Field of the Invention

The present invention relates in general to cellular telephone systems and in particular to methods and systems for selecting drive routes for testing RF coverage in a radiotelephone cell.

2. Description of the Related Art

Cellular telephone systems are based upon two primary subsystems: base stations and mobile units. Each service provider is allocated a coverage area which is divided into a series of cells (typically 7), each further divided into a number of sectors (typically 3). In turn, each cell is controlled by a base station which communicates with up to a given maximum number of mobile units operating in the cell. Communications (transmission and reception) between the base station and the mobile units can be established in either an analog mode, such as AMPS (advanced mobile phone system,) or a digital mode, such as TDMA (time division multiple access) or CDMA (code division multiple access), as selected for a given system.

A key consideration in the design and operation of a cellular telephone system is the reliability of the radio frequency (RF) links between a given base station and the mobile units operating within the associated cell. Reliability is generally a predictor of reception quality as well as the probability that calls will be dropped. Two commonly applied methods of determining RF coverage reliability are: (1) cell edge reliability and (2) cell area reliability. Cell edge reliability refers to the probability that the RF signal strength measured on a contour at the cell edge will exceed a desired quality (signal strength) threshold (e.g., −90 dBm). Cell area reliability refers to the probability that the RF signal strength will meet or exceed the quality threshold after integrating the contour probability over the entire area of the cell. Often a service provider or system user will define minimums for both cell edge reliability and cell area reliability and, depending on the criticality of the given system, these reliability values may range from 70% to 99%. For example, for a system in which reliability is critical, the required contour reliability may be set at 95%, which generally translates to an area failure probability of %5.

Extensive RF field measurements are required in order to obtain the data necessary to calculate the requisite probabilities. Typically, field personnel travel from measurement point to measurement point taking signal strength and precise location measurements. For example, the received signal strength of an RF signal may be measured at a predetermined number of test points in relation to a central transmitter using a Received Signal Strength Indicator (RSSI). The exact location of each of these test points is determined by a GPS (global positioning system) receiver associated with the RSSI receiver. From the empirical signal strength and position data, the probability of the signal strength exceeding the set quality threshold at points along the cell edge and across the cell area can be determined.

The taking of signal strength samples requires substantial effort. Specifically, in order to establish acceptable probabilities, these measurements must be taken at hundreds of thousands of test locations. Further, the test locations cannot be too close or too far from the central receiver in order to properly model the coverage of the entire cell. Since the field personnel normally have to drive from location to location, the process of obtaining the proper number of samples at the proper locations can be time consuming and expensive.

Thus, the need has arisen for systems and methods which provide for the estimation of RF coverage within a cellular telephone system cell. Among other things, such systems and methods should provide for the streamlining of the process of obtaining test data and thus reducing the expense, time and number of personnel required to properly complete the task.

BRIEF DESCRIPTION OF THE DRAWINGS

For a more complete understanding of the present invention, and the advantages thereof, reference is now made to the following descriptions taken in conjunction with the accompanying drawings, in which:

FIG. 5 is a diagram illustrating exemplary resolution requirements for RF coverage estimation;

FIGS. 6A and 6B are diagrams illustrating the estimation of total drive distance required for RF validation in an omni cell;

SUMMARY OF THE INVENTION

Figure 1:
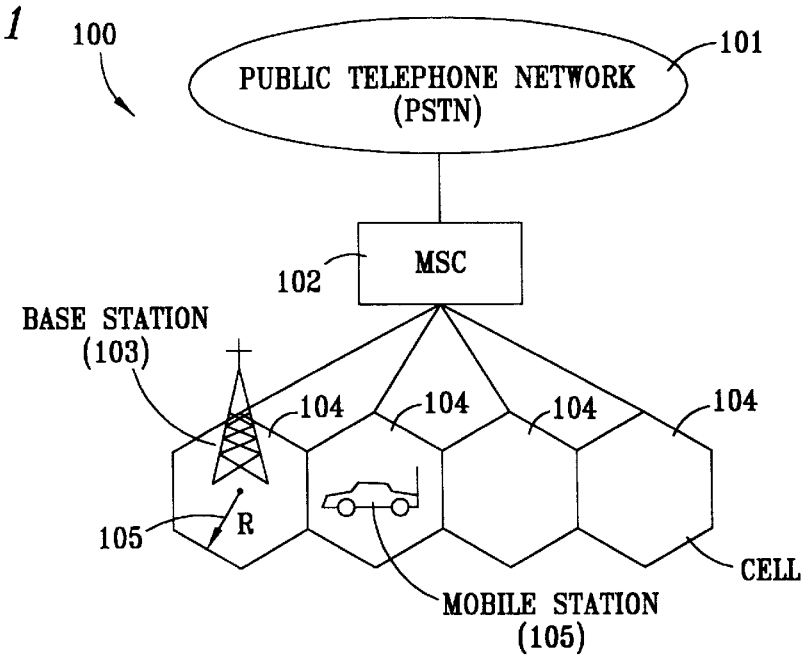
FIG. 1 is a diagram of an exemplary cellular telephone (radiotelephone) system.

According to one embodiment of the present invention, an information processing system is provided for testing RF coverage reliability of a signal transmitted by a base station in a radiotelephone system cell, the system including processing circuitry for receiving information characterizing the cell and outputting in response: 1) estimate a radius of the cell; 2) estimate a bin size for each of a plurality of bins partitioning the cell; 3) estimate a minimum drive distance for validating RF coverage of said cell from said estimated radius and said estimated bin size; and 4) selecting a number of road segments having a combined length exceeding said estimated minimum distance.

According to an additional embodiment of the invention, a method is provided for selecting RF reliability measurement points in a radiotelephone cell in an information processing system which includes the steps of: 1) estimating a minimum drive distance for validating RF coverage of the cell; 2) determining a number of road segments having a combined length exceeding the estimated minimum drive distance; and 3) for a selected cell coverage area, selecting a number of measurement points along the road segments for taking signal strength measurements.

Another embodiment of the invention is illustrated wherein an information processing system is described; a method for selecting RF measurement points in a cell of a cellular telephone system which includes the steps of: 1) receiving signal power data from representative points in the cell along with information characterizing the cell; 2) estimating propagation parameters representing a terrain covered by the cell; 3) estimating a cell radius from the propagation parameters; 4) determining a bin size for each of a plurality of bins partitioning the cell; 5) estimating a minimum drive distance for RF validation; 6) determining a number of road segments having a combined length exceeding said estimated minimum distance; and 7) for a given cell characterization, selecting a number of measurement points along the road segments for taking signal strength measurements.

In sum, principles of the present invention allow for the estimation of the required linear distance that must be driven to validate RF cellular coverage. Specifically, a method is disclosed which is a simple function of three major cellular design parameters: 1) an estimated amount of lognormal fading in the cell; 2) the desired cell radius inaccuracy; and 3) the estimate of the cell radius.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

DESCRIPTION OF THE PREFERRED EMBODIMENTS

The principles of the present invention and their advantages are best understood by referring to the illustrated embodiment depicted in FIGS. 1–8, in which like reference numbers describe like parts.

FIG. 1 is a diagram of a representative cellular telephone (radiotelephone) system 100. A Public Switched Telephone Network (PSTN) 101 interfaces with the cellular subsystems of system 100 through a Mobile Switching Center 102. In particular, Mobile Switching System Center 102 communicates with a series of base stations 103, each associated with a corresponding cell 104 of radius R. For a given cell 104, the corresponding base station transmits information to, and receives information from, one or more mobile stations 105 operating within the area of the cell, as generally defined by radius R at 105.

Figure 2:
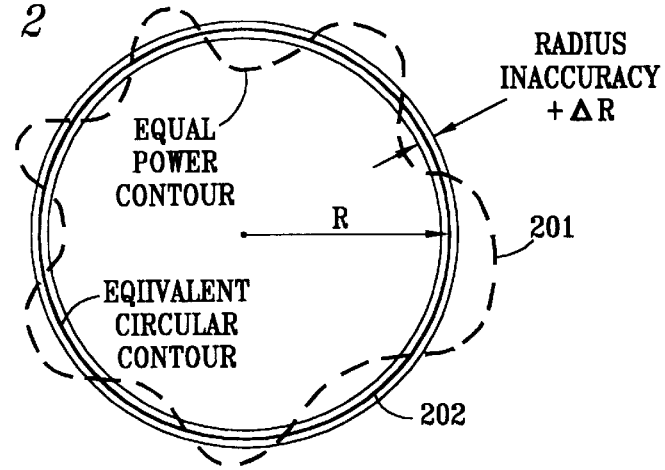
FIG. 2 is a diagram generally illustrating a method for determining of RF reliability using cell radius inaccuracy (ΔR)

FIG. 2 is a diagram generally illustrating a method for determining of RF reliability within a selected cell 104 using cell radius inaccuracy ($\Delta R$). In FIG. 2, an equal power contour (the "true cell edge") at the cell edge is shown at 201 encompassed by equivalent circular contour at 202. The effective radius of the cell from the base station to contour 202 is indicated by R.

Circular contour 202 is estimated to match the power at equal power contour 201 and encloses an area of the cell over which the RF signal strength (quality) meets or exceeds the desired area reliability (e.g., the desired RF signal strength exceeds −90 dBm over 90% of the area of circular contour 202). It should be noted that even the most irregular cell edge can be fitted with such a circle so that the average power along the circumference of the circle is substantially equal to the power at the true cell edge.

The radius R of the circular contour 202 is estimated and hence is considered the "effective radius" of the cell. It should be noted that the effective radius can be defined for any cell, whether the cell is circular or otherwise.

The accuracy of the radius R measurement is quantified in terms of a radius inaccuracy ring $\Delta R$, as shown in FIG. 2, where $\Delta R$ is expressed as a percentage of radius R. The width of this error ring depends primarily of the number of signal strength samples taken in a linear regression and on the amount of lognormal fading $\sigma$ in the cell. Lognormal fading $\sigma$ within each cell is also estimated and then used to compute the fade margin of the cell. The fade margin is then incorporated into the estimation of R to more precisely determine the region of reliability. The relationship between the inaccuracy ($\Delta R$) of the radius estimate and the amount of lognormal fading $\sigma$ in a given cell is empirically derived as a function of the number of signal strength measurements, N.

Figure 3:
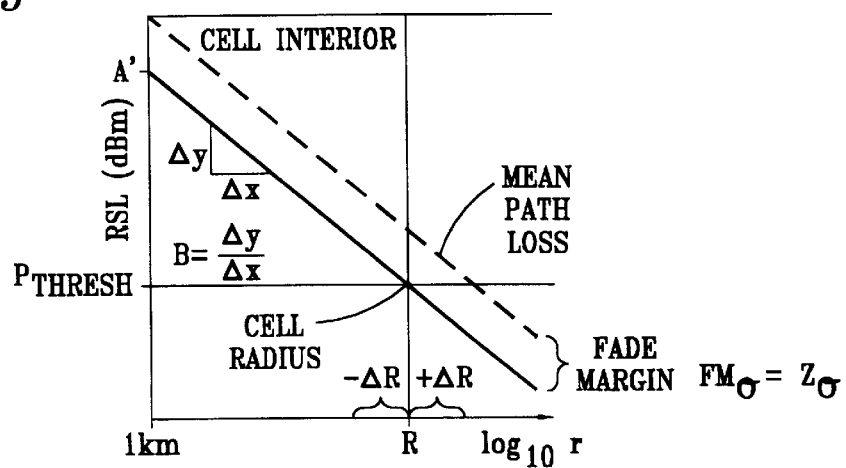
FIG. 3 diagrammatically describes a method of estimation of cell radius R.

The processing estimating radius R is best described in reference to FIG. 3. Generally, a two parameter propagation model is used which does not employ the coefficients required by the prior art "Hata Model"; the salient propagation parameters being estimated from data which allows for RF validation rather than RF prediction.

In FIG. 3, the received signal strength level (RSL) is plotted versus the range from the corresponding base station to each measurement point. The mean path loss is computed via linear regression and offset by the fade margin. The cell radius is then defined in terms of the desired coverage reliability as the point where the fade line crosses the reliability threshold ($P_{THRESH}$).

More specifically, the interior of each cell being examined is divided into approximately 5000 bins which are uniformly sampled both in range and azimuth. Signal strength measurements taken within selected ones of the bins are then averaged to arrive at an average power value per bin. The range is then computed from the base station to the center of all of the bins in which measurements were taken. Thus, each bin represents an average power measurement at a given range from the base station.

The range axis is then mapped to a logarithmic (common log) scale, the transmit power of the base station is combined with the parameter (constant) A and two parameters A' and B of the equivalent model are calculated using linear regression:

$$P_R = A' - Br_L \tag{1}$$

Where: Pr is the received power in dBm, r is the range in kilometers from the base station to the bin measured, $P_t$ is the transmitted power of the base station plus the receiver gain, $r_L = \log_{10} r$, and $A' = P_t - A$.

Once the constants A' and B have been estimated, the mean trend of the propagation data is subtracted from the signal strength measurements and the standard deviation σ of the remaining zero mean process is estimated. The value of σ represents the composite variation due to two primary factors: (1) lognormal fading; and (2) measurement error. Both of these factors tend to introduce uncorrelated errors since the regression is computed for range measurements across all angles, which greatly reduces most spatial correlation effects.

From Equation 1, Equation 2 is derived which gives the distance to the effective cell edge R, at any given signal strength threshold $P_{THRESH}$ and edge reliability F(z):

$$R = 10^{-(P_{THRESH} + FM\sigma - A')/B} \tag{2}$$

Wherein FMσ is the fade margin.

The fade margin FMσ is based on the actual signal variation within the given cell and is calculated to ensure the desired cell edge reliability F(z). Fade margin FMσ is approximated by Equation 3:

$$Fm_{94} = Z\sigma \tag{3}$$

where $$F(z) = \frac{1}{\sqrt{2\pi}} \int_{-\infty}^{Z} e^{-\frac{t^2}{2}} dt$$

Any additional nonfading static, such as building penetration losses, can be incorporated into the $P_{thresh}$ term.

For example, cell edge reliability is F(z) of 75 and 90% correspond to fade margins of about 0.675σ and 1.282σ, respectively.

In sum, A', B and σ are the only parameters required to determine cell radius R. Assuming no measurement error, exact knowledge of the propagation parameters A', B and σ is equivalent to the exact knowledge of R.

Figure 4A:
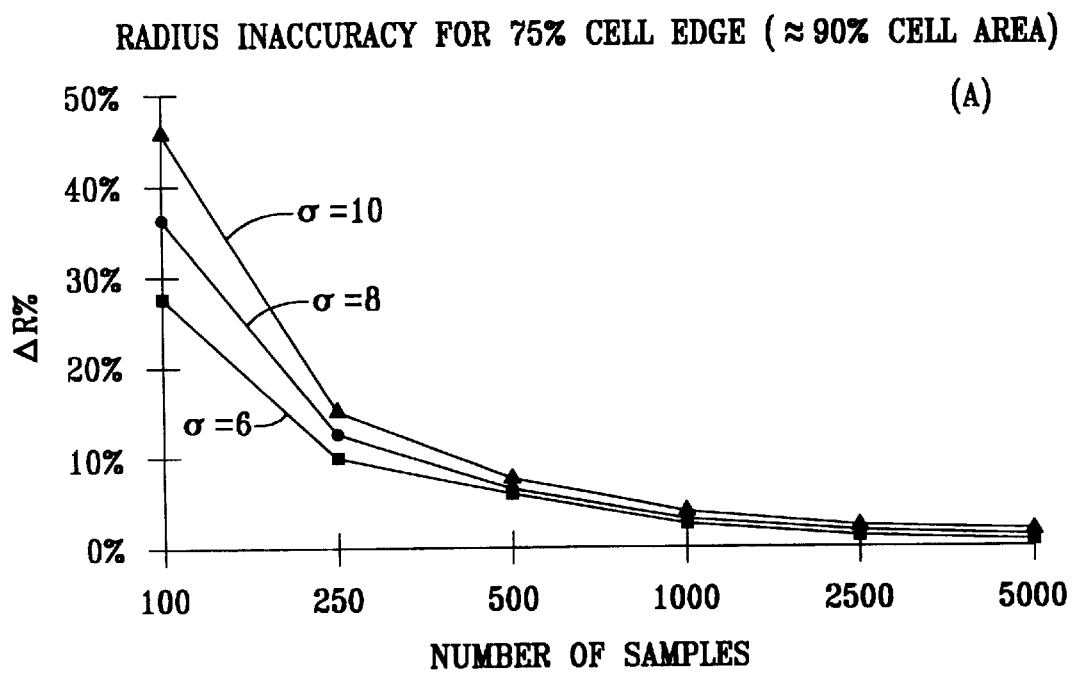
FIGS. 4A and 4B are plots of inaccuracy of measurement versus the number of samples in a linear regression.
Figure 4B:
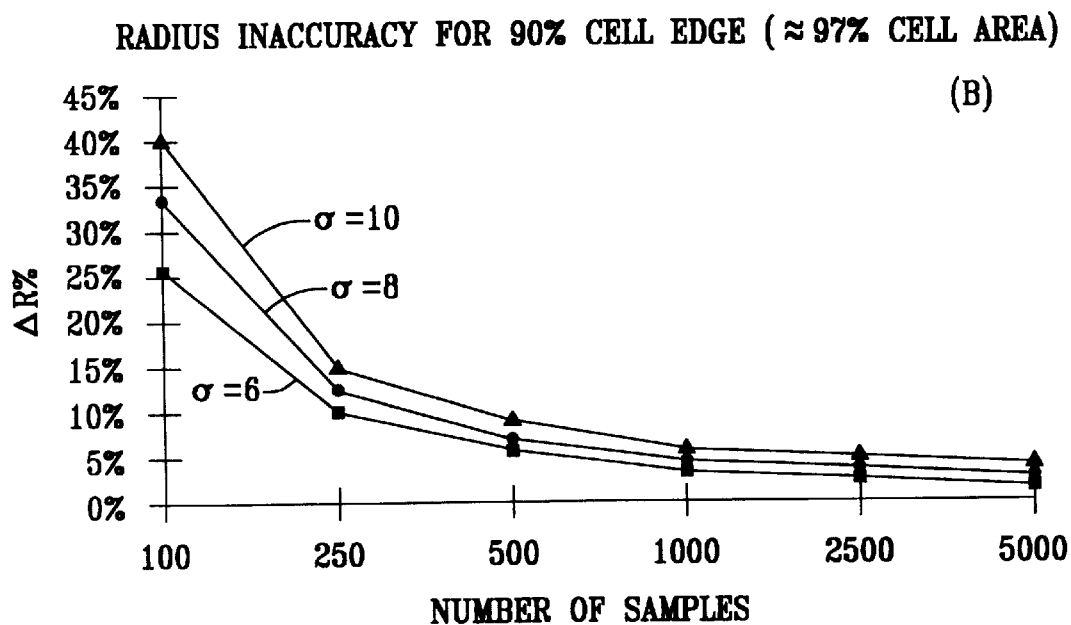

FIGS. 4A and 4B are plots of simulated inaccuracy ΔR of radius R versus the number of samples in the regression. In particular, FIG. 4A depicts a cell radius estimate R of a 75% cell edge reliability design and FIG. 4B depicts a cell radius estimate R of a 95% cell edge reliability design. These representations where derived from Monte Carlo simulations using a two-sided 95% confidence level (i.e., P(R−ΔR ≦ Ř ≦ R+ΔR)=95%).

Each point in the plots of FIGS. 4A and 4B represents the precision of the radius, at 95% confidence, obtained after simulating and processing five million signal strength values. The inaccuracy of the radius estimate ΔR is approximated by Eq. 4 which was determined empirically from the data depicted in FIGS. 3A and 3B:

$$\Delta R \approx \frac{3.821 \frac{\hat{\Lambda}}{\sigma} + 4.619}{N} \tag{4}$$

where: N is the number of independent samples in the regression and σ̂ is the estimated standard deviation of the lognormal fading of the cell.

In Equation 4, the radius inaccuracy ΔR is inversely proportional to the number of samples in the regression, N, and directly proportional to the amount of lognormal fading σ, in the cell. Generally, Equation 4 embodies the practice, known in the art, of taking additional samples in areas subject to negative terrain and clutter effects. In other words Equation 4 specifies the relationship between the desired coverage inaccuracy ΔR, the number of independent signal strength measurements N, and the terrain fading factor within the cell, σ.

FIG. 5 is a diagram illustrating the resolution requirements for coverage estimation. In the illustrated embodiment of FIG. 4, the cell is partitioned into 5000 bins which are uniformly sampled. The subject cell is bounded by a rectangle having a resolution of 80×80 bins.

In order to ensure uniform testing, both in range and in azimuth, of the RF coverage throughout the cell, it is necessary to choose an adequate spacing Δx between the signal strength measurements. As is discussed above in conjunction with FIG. 3, a total of 5,000 independent signal strength samples are required to reduce the cell radius inaccuracy of about 1%. Thus, 5,000 signal strength measurements can be appropriately considered the point of diminishing return since there is very little advantage gained from processing additional samples to achieve an accuracy of less than 1% in the cell radius estimate. Therefore, a reasonable requirement is that the number of post-processing bins within each cell should total 5,000. This can be done by spatially partitioning the cell with a grid of 5,000 bins, each of size Δx by Δx where:

$$\Delta x(m) = \sqrt{\frac{\pi(1000R)^2}{5000}} \approx 25R \text{ (Km)} \tag{5}$$

and where: Δx is the bin size and R is the cell radius the cell radius in kilometers.

An estimate of the local mean of the signal strength is made at the center of each Δx by Δx bin by averaging over at least forty wavelengths of the RF carrier λ. If one were to drive 100% of the cell and record a signal strength measurement at the center of each one of these bins (i.e., all 5,000), then the error in the cell radius estimate after post-processing would be about 1%. However, it is usually not possible to cover 100% of the cell and the error in the cell radius estimate will usually be more than 1%.

Equation 5 is a departure from the standard practice of choosing a fixed bin size (e.g., 100 m×100 m) to measure the signal strength. The larger the cell radius, the coarser the required post-processing resolution. For a cell radius of R=1 km, the necessary resolution is 25 m×25 m. For R=30 km, the resolution is 750 m×750 m. It should be recognized that the post-processing bin size depends on the cell radius since the spatial rate of change of the lognormal fading is almost entirely regulated by the base station antenna height, which is also directly a factor in determining cell radius.

From Equation 5, and as is shown in FIG. 4, the post-processing resolution objective of 5,000 bins is met by enclosing within a square grid of M×M bins, where:

$$M: \frac{1000(2R)}{\Delta X} \approx \frac{2000R}{25R} = 80 \text{ bins} \qquad (6)$$

Again, while it is not required that all 5,000 bins be sampled, it is necessary that the sampling be uniform both in range and in azimuth and sufficiently large enough to meet the desired precision of coverage ΔR, as specified in Equation 4 above.

In addition to setting forth explicit requirements for the post-processing bin size, Equation 5 also implicitly sets forth the requirements for the length of the drive route. For example, Equations 4 and 5 can be used to determine the minimum total linear distance D that must be driven to achieve a desired precision in estimating the cell radius ΔR. Assuming that the space of the drive route is a linear concatenation of N post-processing bins, the length D of the route is given by:

$$D(\text{km}) = \frac{N\Delta x}{1000} \approx \frac{3.821\frac{\Lambda}{\sigma} + 4.619}{\Delta R} \cdot .025R(\text{km}) \approx k_\sigma \frac{R}{\Delta R} \qquad (7)$$

where $k_\sigma$ is a constant that depends only on the lognormal fading, σ in the cell (e.g., $k_\sigma$=1, for σ=9.26 dB).

Significantly, Equation 7 relates the total minimum required distance that must be driven to validate RF signal strength coverage to three major cellular design parameters: (1) the amount of lognormal fading in the cell, σ; (2) the desired cell radius inaccuracy, ΔR; and (3) the cell radius, R. Exemplary values of the minimum required distance D are provided in TABLE 1 for selected cell radii R and their associated bin sizes Δx, for typical values of cell inaccuracy, ΔR.

| R (km)  | 1  |    | 2  |    | 3  |    | 4   |    |
|---------|----|----|----|----|----|----|-----|----|
| Δx (m)  | 25 |    | 50 |    | 75 |    | 100 |    |
| ΔR (%)  | 5  | 10 | 5  | 10 | 5  | 10 | 5   | 10 |
| D (km)  | 18 | 9  | 35 | 18 | 53 | 26 | 70  | 35 |

In TABLE 1, the distances are computed under the assumption that σ=8 dB. A more exact estimate for the required drive distance can be found if the actual amount of lognormal fading in the cell, σ, is known. For example, if the terrain is flat, a typical choice may be σ=6 dB, which reduces D by about 22%. On the other hand, for hilly terrain, σ=10 dB may be a better choice, which increases D by about 22%. It should be noted that the results in TABLE 1 can be generalized for any cell radius R. From Equation 7, the length of the drive routes for ΔR=10% and ΔR=5% are approximately 8.8 R and 17.6 R.

These results can be illustrated in the geometrical example shown in FIGS. 6A and 6B. In FIGS. 6A and 6B, the cell effective edge is represented by a circle and the drive radials are represented by a series of lines extending from the center of the circle, to define a wagon wheel. To resolve the location of the rim of the wheel, (i.e., the effective cell edge), to a given precision, the drive route must extend a certain distance D that is equal to the sum of the lengths of the individual spokes of the wheel. For twice the precision in the cell radius estimate, twice as many spokes must be driven. The length of each spoke is about 0.88 R as calculated above. Ten spokes thus are needed for ΔR=10 (FIG. 5A) and twenty spokes are needed for ΔR=5% (FIG. 5B). Significantly, the actual drive route segments need not be radial and can be any orientation that achieves uniform sampling; the radial drive route segments have only been chosen here for illustrative purposes.

Equation 7 also specifies the theoretical minimum length of an ideal drive route D, although the actual length required for real drive tests is preferably longer. For example, in many cells, it is unlikely that a contiguous drive route of length D exists. Additionally, at the time of a drive test, the cell radius is not exactly known, requiring an additional margin of driving. Further, adjacent cell strength samples along the drive routes are correlated, resulting in some of the measurements in adjacent range bins of the regression to also be correlated. Although these effects lead to drive routes that must be somewhat longer than D, they do not diminish the importance of the result of applying Equation 7 to estimate a lower bond.

In sum, the minimum total distance that must be driven to verify cell coverage can be computed using the cell radius R, the desired radius inaccuracy ΔR, and the amount lognormal fading in the cell σ. Once the minimum drive distance D is calculated, routes exceeding that distance can be selected and selected bins along those routes sampled for RF signal strength.

Figure 7:
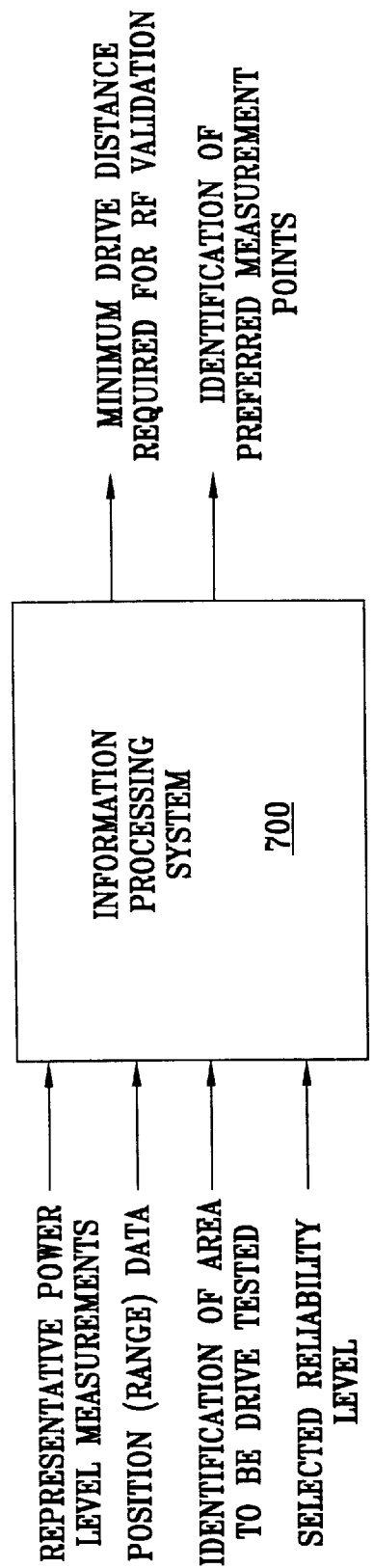
FIG. 7 is a block diagram of an information processing system configured by and operating according to the principles of the present invention.

FIG. 7 is a block diagram of an information processing system 700 configured by and operating in accordance with software embodying the principles of the present invention. System 700 receives information characterizing the area of the cell under test, the selected reliability level desired, along with representative power level measurements taken at selected locations in the cell. System 700 outputs information on the minimum drive distance for RF validation and identifies preferred measurement points.

Figure 8A:
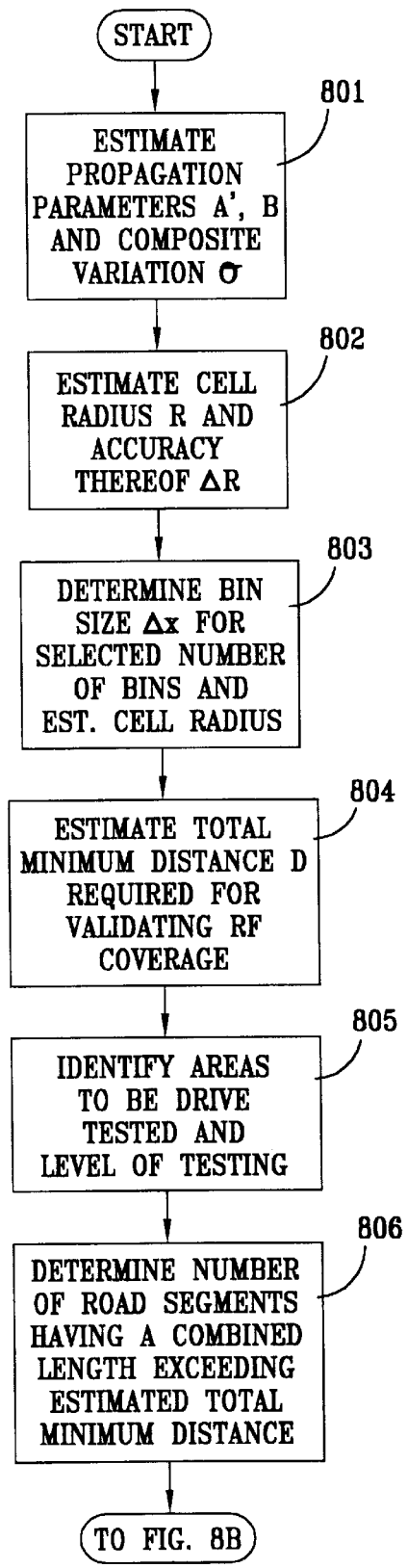
FIG. 8 is a flow chart describing the operation of the information processing system of FIG. 7.
Figure 8B:
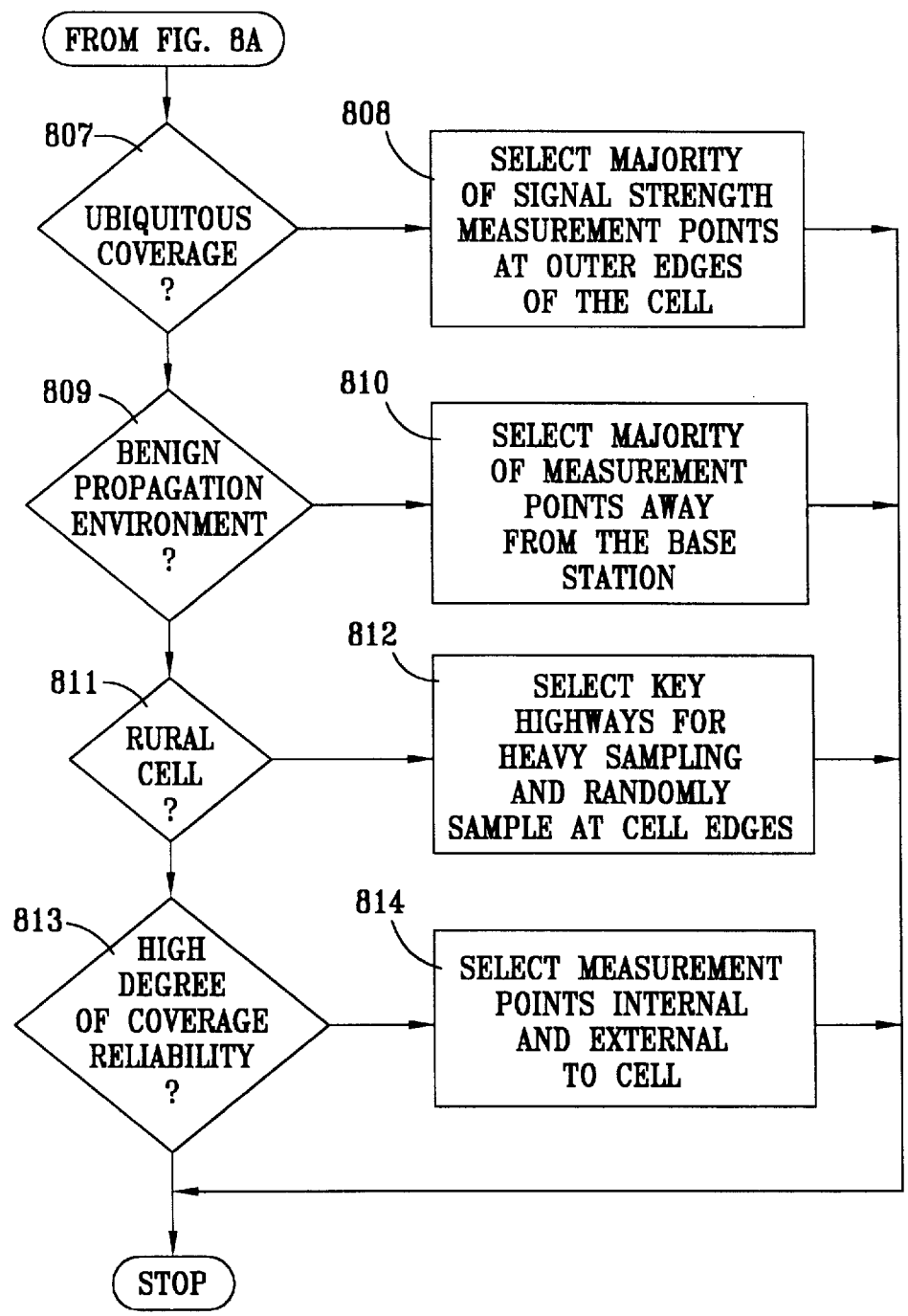

FIG. 8 is a flow chart describing the operation of system 700:

At Step 801, the composite variation, incorporating fade margin and measurement inaccuracy factors, σ and propagation parameters A' and B are determined by linear regression from the representative signal strength and position data. If possible, these propagation parameters are estimated from signal strength measurements taken from locations near to the cell base station. Preferably, the radius is slightly overestimated to allow for small changes in base station location, building penetration loss, and similar factors, that often arise during the final stages of cellular network design.

At Step 802, the cell radius R using Equation 2 with propagation parameters A' and B that are representative of the terrain of interest, as determined at Step 801 is estimated.

At Step 803, the post-processing bin size, Δx is determined, by applying Equation 5.

At Step 804, the total minimum distance D that must be driven to validate the RF coverage is determined by applying Equation 7 and ΔX. Note that, given ΔR, distance D depends only on the cell radius R and the amount of lognormal fading in the cell, σ.

At Step 805, from traffic projections and similar data, the major areas of the cell are identified that must be: (a) heavily drive tested; (b) moderately drive tested; or (c) lightly drive tested.

At Step 806, a key number of important road segments within the identified areas are selected whose combined length add up to the total minimum required drive distance, D, as defined by Equation 7 at Step 804.

If at Step 806 ubiquitous coverage is the objective, then at Step 807 the majority of signal strength measurement points are selected uniformly at the outer regions of the cell (both inside and, if necessary, outside of the cell edge).

If at Step 808 measurements are to be taken in a benign propagation environment, then at Step 809 measurement points are identified at least 30% of the cell radius away from the base station, since there is generally not significantly advantageous to drive in the direct vicinity of the base station; this area produces few signal strength outages.

If at Step 810, signal strength measurements are being taken in rural areas, then at Step 811 measurement points are selected to heavily drive test only a few key highways and similar routes and thereafter randomly take any remaining required measurements from within the cell, preferably near the cell edge (i.e., handoff areas); and If at Step 812, a high degree of coverage reliability is desired, identify additional signal strength measurement points are selected at Step 813, outside the cell boundary, since length of all the road segments within the cell may not be sufficient to meet the minimum drive distance requirements, D. Additionally, as many key areas internal to the cell as possible are identified to ensure that they are adequately represented in the drive test. Remaining required signal strength samples are taken outside of the cell, as close as possible to the cell edge.

In sum, principles of the present invention allow for the estimation of the required linear distance that must be driven to validate RF cellular coverage. Specifically, a method is disclosed which is a simple function of three major cellular design parameters: 1) an estimated amount of lognormal fading in the cell; 2) the desired cell radius inaccuracy; and 3) the estimate of the cell radius.

Although the invention has been described with reference to a specific embodiments, these descriptions are not meant to be construed in a limiting sense. Various modifications of the disclosed embodiments, as well as alternative embodiments of the invention will become apparent to persons skilled in the art upon reference to the description of the invention. It is therefore, contemplated that the claims will cover any such modifications or embodiments that fall within the true scope of the invention.

What is claimed is:

1. An information processing system for testing RF coverage reliability of a signal transmitted by a base station in a radiotelephone system cell comprising:

processing circuitry for receiving information characterizing said cell and outputting in response test information, said processing circuitry operable to:

estimate a radius R of said cell in accordance with the formula:

$$\text{Cell Radius } R \approx 10^{-(P_{THRESH} FM_\sigma - A')/B}$$

where: $P_{THRESH}$ is the desired signal strength threshold, $FM_\sigma$ is the fade margin and A' and B are propagation parameters;

estimate a bin size for each of a plurality of bins partitioning said cell;

estimate a minimum drive distance for validating RF coverage of said cell from said estimated radius and said estimated bin size; and select a number of road segments having a combined length exceeding said estimated minimum distance.

2. The system of claim 1 wherein said processing circuitry is further operable, when ubiquitous coverage is required, to select a number of bins for signal strength measurement along selected ones of said road segments near an outer edge of said cell.

3. The system of claim 1 wherein said processing circuitry is further operable, when testing is in a benign environment, to select a number of bins for signal strength measurement along selected ones of said road segments a selected distance away from the base station.

4. The system of claim 1 wherein said processing circuitry is further operable, when testing is in a rural environment, to select key said road segments for substantial sampling of bins therealong and select random bins elsewhere.

5. The system of claim 1 wherein said processing circuitry is further operable, when a high degree of coverage accuracy is required, to select a number of bins for signal strength measurement along said road segments internal and external to said cell.

6. The system of claim 1 wherein said propagation parameters A' and B are estimated using linear regression from received signal power level and position information.

7. The system of claim 1 wherein said processing circuitry is operable to determine bin size in accordance with the formula:

$$\text{Bin Size } \Delta X \approx \sqrt{\frac{\pi R^2}{\text{\# of Bins}}}.$$

8. The system of claim 7 wherein said processing circuitry is operable to estimate a minimum drive distance in accordance with the formula:

$$\text{Minimum Distance } D = k_\sigma \frac{R}{\Delta R}$$

where $k_\sigma$ is a constant dependent on lognormal fading $\sigma$, and $\Delta R$ is an inaccuracy in radius R.

9. In an information processing system, a method for selecting RF measurement points in a cell of a cellular telephone system comprising the steps of:

receiving signal power data from representative points in the cell and information characterizing the cell;

estimating propagation parameters representing a terrain covered by the cell;

estimating a cell radius R from the propagation parameters in accordance with the formula:

$$\text{Cell Radius } R \approx 10^{-(P_{THRESH} + FM_\sigma - A')/B}$$

where: $P_{THRESH}$ is the desired signal strength threshold, $FM_\sigma$ is the fade margin and A' and B are propagation parameters determining a bin size for each of a plurality of bins partitioning the cell;

estimating a minimum drive distance for RF validation;

determine a number of road segments having a combined length exceeding said estimated minimum distance; and for a given cell characterization, selecting a number of measurement points along the road segments for taking signal strength measurements.

10. The method of claim 9 wherein the cell is characterized as covering ubiquitous coverage area and said step of selecting measurement points comprises the step of selecting a number of measurement points near an outer edge of the cell.

11. The method of claim 9 wherein the cell is characterized as covering a benign environment and said step of testing comprises the step of selecting a number of measurement points a selected distance from a base station transmitting in the cell.

12. The method of claim 9 wherein the cell is characterized as covering a rural environment and said step of selecting comprises the step of selecting a substantial number of measurement points along key said road segments and randomly selecting a number of points elsewhere.

13. The method of claim 9 wherein said selected cell is characterized as covering a high coverage accuracy area and said step of selecting comprises the step of selecting measurement points along within and without an edge of the cell.

14. The method of claim 9 wherein said step of estimating propagation parameters comprises the step of estimating the propagation parameters using linear regression and received signal strength data.

15. In an information processing system, a method for selecting RF measurement points in a cell of a cellular telephone system comprising the steps of:

receiving signal power data from representative points in the cell and information characterizing the cell;

estimating propagation parameters representing a terrain covered by the cell;

estimating a cell radius from the propagation parameters;

determining a bin size for each of a plurality of bins partitioning the cell in accordance with the formula:

$$\text{Bin Size } \Delta X \approx \sqrt{\frac{\pi R^2}{\text{\# of Bins}}};$$

estimating a minimum drive distance for RF validation;

determine a number of road segments having a combined length exceeding said estimated minimum distance; and for a given cell characterization, selecting a number of measurement points along the road segments for taking signal strength measurements.

16. In an information processing system, a method for selecting RF measurement points in a cell of a cellular telephone system comprising the steps of:

receiving signal power data from representative points in the cell and information characterizing the cell;

estimating propagation parameters representing a terrain covered by the cell;

estimating a cell radius from the propagation parameters;

determining a bin size for each of a plurality of bins partitioning the cell;

estimating a minimum drive distance for RF validation in accordance with the formula:

$$\text{Minimum Distance } D = k_\sigma \frac{R}{\Delta R}$$

where $k_o$ is a constant dependent on lognormal fading $\sigma$, and $\Delta R$ is an inaccuracy in radius R;

determine a number of road segments having a combined length exceeding said estimated minimum distance; and for a given cell characterization, selecting a number of measurement points along the road segments for taking signal strength measurements.

* * * * *

UNITED STATES PATENT AND TRADEMARK OFFICE
CERTIFICATE OF CORRECTION

PATENT NO. : 6,052,583
DATED : April 18, 2000
INVENTOR(S) : Bernardin

It is certified that error appears in the above-indentified patent and that said Letters Patent is hereby corrected as shown below:

Column 5, line 49   Delete "$Fm_{94}=Z\sigma$"
                    Insert --$Fm_\sigma=Z\sigma$--

Signed and Sealed this

Twentieth Day of February, 2001

Attest:

NICHOLAS P. GODICI

Attesting Officer          Acting Director of the United States Patent and Trademark Office